US010818106B2

(12) United States Patent
Zula et al.

(10) Patent No.: US 10,818,106 B2
(45) Date of Patent: Oct. 27, 2020

(54) SYSTEM AND METHOD FOR PRE-TRIP INSPECTION OF A TRACTOR-TRAILER

(71) Applicant: Bendix Commercial Vehicle Systems LLC, Elyria, OH (US)

(72) Inventors: Daniel P. Zula, North Ridgeville, OH (US); Hans M. Molin, Mission Viejo, CA (US); Michael D. Cremona, Lakewood, OH (US); Adedapo A. Alabi, Elyria, OH (US); Timothy J. Frashure, Columbia Station, OH (US); Thomas J. Hayes, Lakewood, OH (US)

(73) Assignee: Bendix Commercial Vehicle Systems LLC, Elyria, OH (US)

( * ) Notice: Subject to any disclaimer, the term of this patent is extended or adjusted under 35 U.S.C. 154(b) by 134 days.

(21) Appl. No.: 16/160,023

(22) Filed: Oct. 15, 2018

(65) Prior Publication Data

US 2020/0118361 A1    Apr. 16, 2020

(51) Int. Cl.
*G07C 5/08* (2006.01)
*G01M 17/007* (2006.01)

(52) U.S. Cl.
CPC ......... *G07C 5/0808* (2013.01); *G01M 17/007* (2013.01); *G07C 5/0841* (2013.01)

(58) Field of Classification Search
CPC ............................ G07C 5/0858; G07C 5/0866
See application file for complete search history.

(56) References Cited

U.S. PATENT DOCUMENTS

| 6,064,299 A | 5/2000 | Lesesky et al. |
| 7,040,435 B1 | 5/2006 | Lesesky et al. |

(Continued)

FOREIGN PATENT DOCUMENTS

| DE | 102014001834 A1 | 8/2014 |
| JP | 2017043190 A * | 3/2017 |

(Continued)

OTHER PUBLICATIONS

Fleet Solutions, Inc., "Verifier Trailer Inspection System User Guide" (Oct. 26, 2016).

(Continued)

*Primary Examiner* — Daniel J Colilla
(74) *Attorney, Agent, or Firm* — Reising Ethington P.C.

(57) ABSTRACT

A system and method for pre-trip inspection of a tractor trailer are provided. The system includes a communications gateway configured for electronic communication with a vehicle control system of the tractor-trailer and a computing device configured for communication with the vehicle control system through the communications gateway. The device is configured to display an instruction to a user to perform a task of the pre-trip inspection and receive an input associated with the task from the user. The input is indicative of an operating characteristic of the tractor-trailer. The device may be further configured to determine whether the operating characteristic meets a predetermined condition. The device is further configured to transmit an instruction to the vehicle control system through the communications gateway when the operating characteristic does not meet the predetermined condition. The instruction establishes a restriction on operation of the tractor-trailer.

26 Claims, 10 Drawing Sheets

(56) References Cited

U.S. PATENT DOCUMENTS

| | | |
|---|---|---|
| 7,102,494 B2 | 9/2006 | Lesesky et al. |
| 7,155,321 B2 | 12/2006 | Bromley et al. |
| 7,263,417 B2 | 8/2007 | Gutierrez et al. |
| 8,179,238 B2 | 5/2012 | Roberts, Sr. et al. |
| 8,626,568 B2 | 1/2014 | Warkentin et al. |
| 9,014,876 B2 | 4/2015 | Mason et al. |
| 9,227,568 B1 | 1/2016 | Hubbell et al. |
| 9,424,751 B2 | 8/2016 | Hodges et al. |
| 2005/0046584 A1* | 3/2005 | Breed .................. B60N 2/0232 340/13.31 |
| 2006/0235586 A1 | 10/2006 | Waszkowski et al. |
| 2008/0143593 A1 | 6/2008 | Graziano et al. |
| 2008/0312786 A1 | 12/2008 | Day |
| 2011/0071720 A1 | 3/2011 | Schondorf et al. |
| 2011/0273279 A1 | 11/2011 | Vandivier et al. |
| 2012/0191270 A1 | 7/2012 | Floyd |
| 2012/0271503 A1 | 10/2012 | Owens et al. |
| 2015/0012445 A1 | 1/2015 | Reid |
| 2015/0094903 A1 | 4/2015 | Bell |
| 2015/0094905 A1 | 4/2015 | Frashure et al. |
| 2016/0035156 A1 | 2/2016 | Andrus |
| 2016/0121792 A1 | 5/2016 | Christopherson et al. |
| 2016/0300402 A1 | 10/2016 | Nassar et al. |
| 2017/0039356 A1* | 2/2017 | Brewer .................. G06F 21/35 |
| 2017/0116792 A1* | 4/2017 | Jelinek .................... G07C 5/12 |
| 2018/0157255 A1* | 6/2018 | Halverson ............. B64C 39/024 |
| 2018/0293818 A1* | 10/2018 | Linsmeier ............ G07C 5/0825 |
| 2019/0143952 A1* | 5/2019 | Hearing ................ B60T 17/221 340/453 |
| 2019/0228322 A1* | 7/2019 | Wenner .................. G06N 7/005 |

FOREIGN PATENT DOCUMENTS

| | | |
|---|---|---|
| WO | 2002/008057 A1 | 1/2002 |
| WO | 2011/142852 A1 | 11/2011 |
| WO | 2014/102171 A1 | 7/2014 |

OTHER PUBLICATIONS

Canvas Solutions, Inc., "Truck Driver's Pre Trip Checklist Mobile App," (https://www.gocanvas.com/mobile-forms-apps/9433-Truck-Driver-s-Pre-Trip-Checklist).

Noregon Systems, Inc. The Single Source Solution for Trailer Diagnostics (2018).

Machine Translation of DE 10 2014 001 834 A1.

* cited by examiner

SYSTEM AND METHOD FOR PRE-TRIP INSPECTION OF A TRACTOR-TRAILER

BACKGROUND OF THE INVENTION a. Field of the Invention

This invention relates to a system and method for pre-trip inspection of a tractor-trailer. In particular, this invention relates to a system and method for pre-trip inspection that enable an efficient and accurate inspection of the tractor-trailer and that implement restrictions on operation of the tractor-trailer in response to issues identified during the inspection.

b. Background Art

Prior to operation of a tractor-trailer, operators frequently perform a pre-trip inspection to identify issues that might compromise safe operation of the tractor-trailer or lead to violations of government laws and regulations. These inspections are often time consuming. For example, a manual inspection of each light on a tractor-trailer is typically required to determine whether one or more lights is not working—even in tractor-trailers with bulb-out detection systems (because these systems generally do not identify the individual light or lights that are not operating properly). Because of the time required for a complete inspection of the tractor-trailer, operators that are relatively new or in a hurry may skip a portion or all of the inspection. Even when a complete inspection is performed, operators may choose to ignore issues identified during the inspection and the inspection is, to a degree, limited by the objectivity of the operator. Failing to perform a pre-trip inspection, ignoring the results of an inspection and/or improperly performing an inspection can result in potential safety hazards or legal violations. There is also typically no method for a fleet manager to prevent operation of the vehicle by the operator despite these failures. In addition, operators also frequently fail to organize and store information from pre-trip inspections in a manner that can be conveyed to fleet managers in a timely and useful way.

The inventors herein have recognized a need for a system and method for pre-trip inspection of a tractor-trailer that will minimize and/or eliminate one or more of the above-identified deficiencies.

BRIEF SUMMARY OF THE INVENTION

This invention relates to a system and method for pre-trip inspection of a tractor-trailer. In particular, this invention relates to a system and method for pre-trip inspection that enable an efficient and accurate inspection of the tractor-trailer and that implement restrictions on operation of the tractor-trailer in response to issues identified during the inspection.

A system for pre-trip inspection of a tractor-trailer in accordance with one embodiment includes a communications gateway configured for electronic communication with a vehicle control system of the tractor-trailer and a computing device configured for communication with the vehicle control system of the tractor-trailer through the communications gateway. The computing device is further configured to display an instruction to a user to perform a task of the pre-trip inspection and to receive an input associated with the task from the user. The input is indicative of an operating characteristic of the tractor-trailer. The computing device is further configured to transmit, when the operating characteristic does not meet a predetermined condition, an instruction to the vehicle control system through the communications gateway. The instruction establishes a restriction on operation of the tractor-trailer.

An article of manufacture in accordance with one embodiment includes a non-transitory computer storage medium having a computer program encoded thereon that when executed by a controller implements a pre-trip inspection of a tractor-trailer. The computer program includes code for displaying an instruction to a user to perform a task of the pre-trip inspection and receiving an input associated with the task from the user. The input is indicative of an operating characteristic of the tractor-trailer. The computer program further includes code for transmitting, when the operating characteristic does not meet a predetermined condition, an instruction to a vehicle control system of the tractor-trailer. The instruction establishes a restriction on operation of the tractor-trailer.

A method for pre-trip inspection of a tractor-trailer in accordance with one embodiment includes the step of displaying an instruction to a user to perform a task of the pre-trip inspection on a computing device configured for communication with a vehicle control system of the tractor-trailer through a communications gateway on the tractor-trailer. The method further includes the step of receiving an input associated with the task from the user. The input is indicative of an operating characteristic of the tractor-trailer. The method further includes the step of transmitting, when the operating characteristic does not meet a predetermined condition, an instruction from the computing device to the vehicle control system through the communications gateway. The instruction establishes a restriction on operation of the tractor-trailer.

A system and method for pre-trip inspection of a tractor-trailer in accordance the present teachings represent an improvement as compared to conventional systems and methods. The system and method improve the efficiency of the pre-trip inspection. The increased efficiency improves operator satisfaction and operator retention for fleet operators. Because operators are more likely to adhere to inspection requirements, the system and method reduces potential safety hazards and legal violations. The system and method also result in a more coherent organization of information from pre-trip inspections and rapid communication of the information to fleet operators. The system and method also automatically implement restrictions on operation of the tractor-trailer in response to issues identified during the inspection, preventing vehicle operators from ignoring issues and leading to consistent standards of operation within fleets.

The foregoing and other aspects, features, details, utilities, and advantages of the present invention will be apparent from reading the following description and claims, and from reviewing the accompanying drawings.

DETAILED DESCRIPTION OF THE INVENTION

Figure 1:
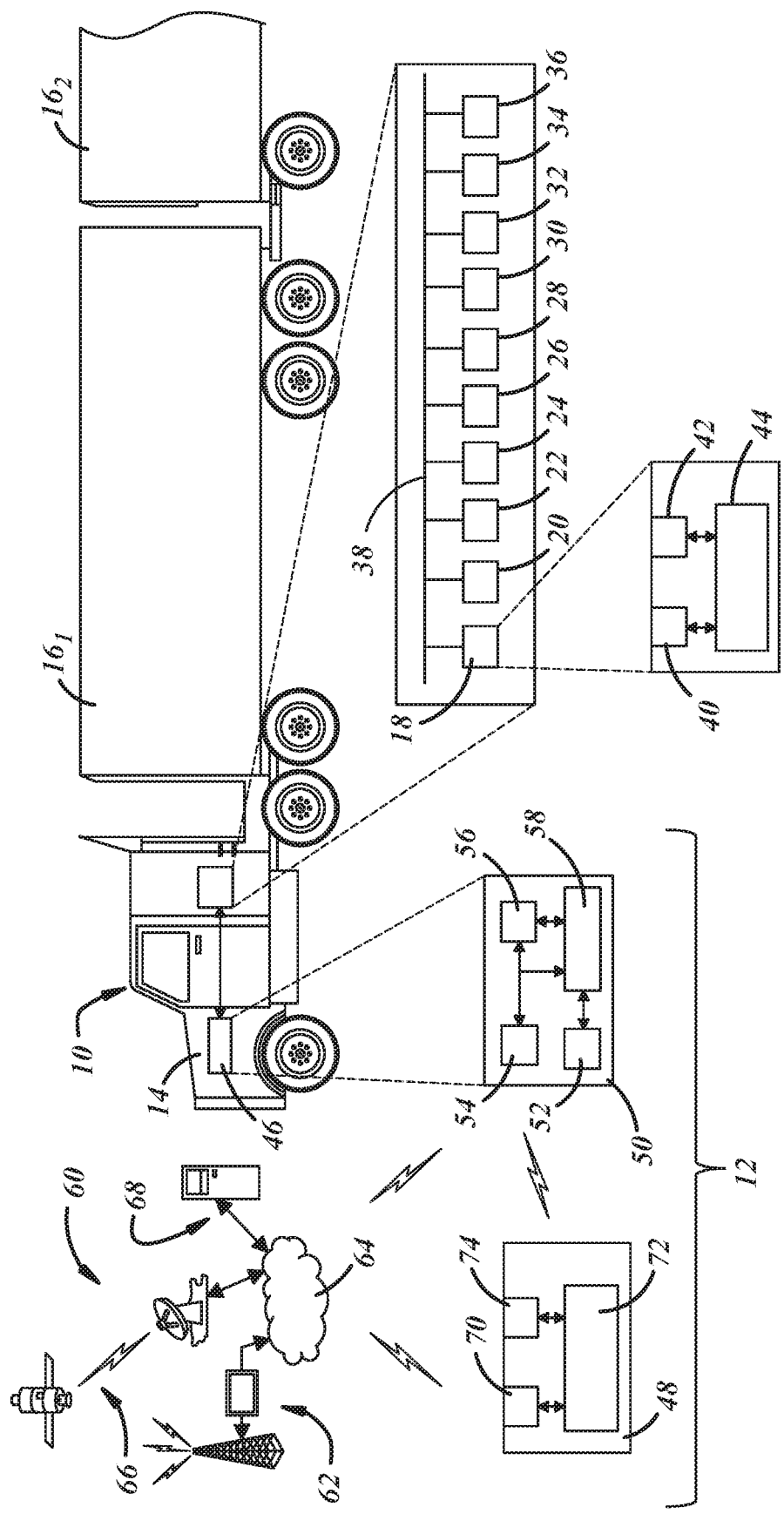
FIG. 1 is a diagrammatic view of one embodiment of a system for pre-trip inspection of a tractor-trailer.

Referring now to the drawings wherein like reference numerals are used to identify identical components in the various views, FIG. 1 illustrates a tractor-trailer 10 and one embodiment of a system 12 for pre-trip inspection of tractor-trailer 10. Tractor-trailer 10 (also referred to as a semi) contains a truck or tractor 14 (also referred to as a power unit) and one or more trailers $16_1 \ldots 16_N$ (also referred to as towed units). Tractor 14 contains a power unit, such as an internal combustion engine, and steering and drive axles each of which support one or more wheels at either end. Trailers $16_1 \ldots 16_N$ are provided to store freight and are detachably coupled to tractor 14. Each trailer 16 is supported on one or more trailer axles each of which may support one or more wheels at either end. Although a pair of trailers 16 are shown in the illustrated embodiment, it should be understood that the number of trailers 16 attached to tractor 14 may vary.

Tractor-trailer 10 includes a variety of vehicle control systems 18, 20, 22, 24, 26, 28, 30, 32, 34, 36 for controlling and/or monitoring the operation of tractor-trailer 10 and components thereof. Each system 18, 20, 22, 24, 26, 28, 30, 32, 34, 36 is preferably connected to other devices on tractor-trailer 10 and to other systems 18, 20, 22, 24, 26, 28, 30, 32, 34, 36 by a communications bus 38 such as a controller area network (CAN) (or another communication medium such as power line communication (PLC) or Local Interconnect Network (LIN)). Each system 18, 20, 22, 24, 26, 28, 30, 32, 34, 36 can be programmed to run vehicle system and subsystem diagnostic tests and generate diagnostic trouble codes (DTCs) that allow a technician to rapidly identify and remedy malfunctions within tractor-trailer 10. Each system 18, 20, 22, 24, 26, 28, 30, 32, 34, 36 includes electronic hardware and software components that may be located throughout tractor-trailer 10. These components include input devices 40, output devices 42, and a controller 44.

Input devices 40 are provided to transmit information and commands to controller 44. Information may include information on the operation of tractor-trailer 10, the environment in which tractor-trailer 10 is operating and nearby objects. Commands may include commands from an operator of tractor-trailer 10 (e.g., desired speed or direction of travel) or from electronic control components on tractor-trailer 10 including those from other control systems 18, 20, 22, 24, 26, 28, 30, 32, 34, 36. Input devices 40 may comprise sensors that detect operating conditions of tractor-trailer 10 (including individual systems or components of tractor-trailer 10 such as an engine or transmission), environmental conditions relating to the operating environment of tractor-trailer 10 or characteristics of objects external to tractor-trailer 10 (e.g., other vehicles, guardrails, etc.) including the presence or absence of such objects, the position or change in position of such objects, and movements of such objects. Exemplary sensors may include wheel speed sensors that are coupled to each wheel of tractor-trailer 10 and separately report the rotational velocity of each wheel, a steer angle sensor that generates a signal indicative of a steering angle imparted by an operator to a steering wheel in the tractor-trailer 10, a yaw rate sensor that generates a signal indicative of the angular velocity of the tractor of tractor-trailer 10 about its vertical (yaw) axis, pressure sensors that generate signals indicative of the fluid pressure within fluid conduits, load sensors that generate signals indicative of the forces at various locations on the vehicle, or position sensors that are used to detect the position of other vehicles on the road including, for example, light detection and ranging (LIDAR) devices, ultrasonic devices, radio detection and ranging (RADAR) devices, and vision device (e.g., camera, etc.). Input devices 40 may also comprise operator input devices used to receive information or commands such as a desired vehicle speed, desired position relative to other vehicles, and a desired braking force. The operator input devices may include, for example, microphones, pedals, levers, buttons, etc. Input devices 40 may also comprise wireless communication devices such as a telematics unit that receives information and commands from an external source.

Output devices 42 are provided to cause an action in tractor-trailer 10, including implementation of commands from the operator of tractor trailer 10 or other vehicle control systems 18, 20, 22, 24, 26, 28, 30, 32, 34, 36, and/or to convey information. Output devices 42 may include switches, valves, solenoids, electric motors, actuators and other devices that are used to cause a physical action within tractor-trailer 10. Output devices 42 may also comprise operator output devices used to provide information including speakers, lights and displays. Output devices 42 may also comprise wireless communication devices such as a telematics unit that transmits information to an external destination.

Controller 44 is provided to monitor or control the operation of one or more components of tractor-trailer 10. Controller 44 may comprise a programmable microprocessor or microcontroller or may comprise an application specific integrated circuit (ASIC). Controller 44 may include a memory that stores look up tables or other data structures and software programs. Controller 44 may also include a central processing unit (CPU) that executes instructions for software, firmware, programs, algorithms, scripts, etc. that are stored in memory. Controller 44 may also include an input/output (I/O) interface including a plurality of input/output pins or terminals through which the controller 44 may receive a plurality of input signals and transmit a plurality of output signals. The input signals may include signals received from input devices 40 and the output signals may include signals transmitted to output devices 42. It should be understood that the functionality of a controller 44 for any of systems 18, 20, 22, 24, 26, 28, 30, 32, 34, 36 could be subdivided among multiple controllers configured to communicate with one another over vehicle communication bus 38 and among controllers for multiple vehicle control systems 18, 20, 22, 24, 26, 28, 30, 32, 34, 36.

Vehicle control systems 18, 20, 22, 24, 26, 28, 30, 32, 34, 36 may be used to control and/or monitor a wide variety of systems and components within tractor-trailer 10. The systems may, for example, include an engine control system 18, a transmission control system 20, a body control system 22, a brake control system 24, a traction control system 26, a stability control system 28, an adaptive cruise control system 30, a bulb-out detection system 32, a collision avoidance system 34, and a navigation system 36 among other systems Engine control system 18 controls various aspects of engine operation such as the air-fuel mixture in the engine, ignition timing and idle speed. System 18 may control various valves and actuators in the engine in response to inputs received from sensors measuring air flow, pressure, temperature, vehicle speed, emissions and other parameters.

Transmission control system 20 controls changes in transmission gears. System 20 may control solenoids in the vehicle transmission in response to inputs received from sensors measuring vehicle speed, throttle position, transmission fluid temperature and other parameters.

Body control system 22 controls various electrical components located throughout tractor-trailer 10, such as interior and exterior lights, power door locks, power windows, and power mirrors. System 22 may control various light emitters, switches, motors and actuators in response to inputs received from operator input devices and other vehicle control systems 18, 20, 24, 26, 28, 30, 32, 34, 36.

Brake control system 24 controls application of the wheel brakes on tractor-trailer 12. Brake control system 24 may control valves that control fluid pressure delivered to brake actuators in response to inputs received from sensors measuring wheel speed, steer angle, and vehicle yaw rate, operator input devices such as a brake pedal or parking brake control interface and other vehicle control systems 18, 20, 22, 26, 28, 30, 32, 34, 36. System 24 may include an anti-lock braking system that modulates fluid pressure to the brake actuators under certain conditions and a hill start assist system that controls the release of fluid pressure to the brake actuators during release of the brakes while the tractor-trailer is on surface having more than a predetermined gradient.

Traction control system 26 controls delivery of power to the wheels of tractor-trailer 10 to eliminate wheel slip due to, for example, low friction road surfaces (e.g., icy, snowy or sandy road surfaces). System 26 controls valves that control fluid pressure delivered to the brake actuators and/or a throttle valve, fuel injectors, and/or or spark plugs, to control delivery of air or fuel and/or spark timing in cylinders of an internal combustion engine in response to inputs received from sensors measuring wheel speeds at each wheel.

Stability control system 28 controls delivery of power to the wheels of tractor-trailer 10 to maintain vehicle stability during turns. System 28 controls valves that control fluid pressure delivered to the brake actuators and/or a throttle valve, fuel injectors, and/or or spark plugs, to control delivery of air or fuel and/or spark timing in cylinders of an internal combustion engine in response to inputs received from sensors measuring wheel speeds, steer angle, and yaw rate of tractor-trailer 10.

Adaptive cruise control system 30 controls components of the power system (e.g., the throttle valve) and brake system of tractor-trailer 10 to maintain a predetermined speed and/or position relative to other vehicles and can be used to implement platooning in multiple tractor-trailers 10. System 30 controls valves that control air flow through the throttle and/or valves that control fluid pressure delivered to the brake actuators in response to inputs received from operator input devices and from sensors measuring distances and speeds of nearby objects.

Bulb-out detection system 32 monitors the operational status of external lights on tractor-trailer 10. System 32 controls an operator interface (e.g., one or more lights in the cabin of tractor-trailer 10) in response to inputs received from sensors measuring the current draw to the lights.

Collision avoidance system 34 detects and attempts to mitigate or avoid collisions with objects external to tractor-trailer 10. System 34 may comprise one or more of a forward collision warning system, a front automatic braking system, forward or rear park assist systems, lane departure warning systems, side blind zone alert systems, side or rear object detection systems, or rear automatic braking systems. System 34 may control valves that control fluid pressure delivered to the brake actuators, a throttle valve, fuel injectors, and/or or spark plugs that control delivery of air or fuel and/or spark timing in cylinders of an internal combustion engine, and or motors and actuators controlling vehicle steering in response to inputs from sensors such as light detection and ranging (LIDAR) sensors, ultrasonic sensors, radio detection and ranging (RADAR) sensors, cameras or a combination thereof that detect characteristics of objects external to the vehicle (e.g., other vehicles, guardrails, etc.) including the presence or absence of such objects, the position or change in position of such objects, and movements of such objects.

Navigation system 36 provides directional guidance to the operator of tractor-trailer 10 and related information. System 36 may control a user interface that is configured to receive information input by the operator and to generate audio or visual indications of travel directions, warnings, and information on local attractions such as restaurants, lodging and tourist sites. System 36 is configured to receive signals from a global positioning system (GPS) receiver that is itself configured to receive signals from GPS satellites and to process the signals from the receiver to determine the current location of tractor-trailer 10. System 36 is also configured to receive signals from a telematics unit or other wireless communication system through which system 36 may receive geographic information (e.g., updated maps, map annotations (points of interest, restaurants, traffic or accident information), route calculations and the like). System 36 generates the outputs referenced above in response to destination information entered at the user interface, location information from the GPS receiver, and geographic information obtained through the telematics unit.

System 12 is provided to facilitate a pre-trip inspection of tractor-trailer 10. System 12 includes a communications gateway 46 and a computing device 48 for use by the operator of tractor-trailer 10 or another individual.

Communications gateway 46 is provided to connect telecommunication networks using different communication protocols and, in particular, to connect computing device 48 with vehicle control systems 18, 20, 22, 24, 26, 28, 30, 32, 34, 36 by connecting device 48 to communications bus 38. In certain embodiments, gateway 46 may also be used to connect device 48 with computing devices external to tractor-trailer 10 including those used, for example, by fleet managers. Gateway 46 may be embedded within one or more of control systems 18, 20, 22, 24, 26, 28, 30, 32, 34, 36 or may exist separate from control systems 18, 20, 22, 24, 26, 28, 30, 32, 34, 36. In certain embodiments, gateway 46 may comprise a tool that can be connected by an operator to tractor-trailer 10 (e.g., through a vehicle diagnostic port on tractor-trailer 10). In other embodiments, gateway 46 may comprise a vehicle telematics system 50. Depending on the configuration of gateway 46, gateway 46 may communicate with computing device 48 through a wired or wireless connection.

Telematics system 50 handles communications between tractor-trailer 10 and remote servers, other vehicles, and other nearby wireless communication devices such as device 48. System 50 enables wireless voice and/or data communication over a wireless carrier system and via wireless networking. System 50 may enable communication between tractor-trailer 10 and a call center, other telematics-enabled vehicles, or some other entity or device. System 50 can therefore be used to provide a diverse range of vehicle services that involve wireless communication to and/or from tractor-trailer 10. Such services include: turn-by-turn directions and other navigation-related services that are provided in conjunction with the GPS-based vehicle navigation system 36; airbag deployment or collision notification and other emergency or roadside assistance-related services that are provided in response to signals received from vehicle control systems 18, 20, 22, 24, 26, 28, 30, 32, 34, 36; and diagnostic reporting using information obtained from vehicle control systems 18, 20, 22, 24, 26, 28, 30, 32, 34, 36. In accordance with the present teachings, system 50 also acts as a communications gateway between computing device 48 and vehicle control systems 18, 20, 22, 24, 26, 28, 30, 32, 34, 36. The above-listed services are by no means an exhaustive list of all of the capabilities of telematics system 50, but are simply an enumeration of some of the services that the telematics system 50 is capable of offering. System 50 may include a user interface 52, a pair of network interfaces 54, 56 and a controller 58.

User interface 52 enables the operator to access or initiate various services through telematics system 50 and to provide and receive information from a call center, other telematics-enabled vehicles or other entity or device. Interface 52 may include any combination of hardware, software and/or other components that enable the operator to exchange information or data through system 50 including input devices such as a microphone, one or more pushbuttons, a touch-screen display allowing user interface 52 to receive information from the operator, as well as output devices like speakers, a visual display, or an instrument panel allowing user interface 52 to provide information to the operator. Some components of interface 52 may be connected directly to the telematics system 50 whereas others are indirectly connected using one or more network connections, such as vehicle communications bus 38.

Network interface 54 is configured for connection to a telecommunications network 60. Network 60 may comprise the public internet, a local area network (LAN), wide area network (WAN), virtual private network (VPN) or other form of telecommunications network. Network 60 may include a wireless carrier system such as a cellular telephone system 62 that includes a plurality of cell towers or cellular base stations, one or more 2G/3G mobile switching centers (MSCs) or 4G+ Evolved Packet Core (EPC) systems and other networking components required to connect the wireless carrier system with a land-based telecommunications network 64. Network 64 may comprise a public switched telephone network (PSTN) such as that used to provide hardwired telephony, packet-switched data communications, and the Internet infrastructure. One or more segments of network 64 could be implemented through the use of a standard wired network, a fiber or other optical network, a cable network, power lines, other wireless networks such as wireless local area networks (WLANs), or networks providing broadband wireless access (BWA), or any combination thereof. As an alternative or in addition to the cellular telephone system 62, the wireless carrier system may comprise a satellite communication system 66 that provides uni-directional or bi-directional communication with tractor-trailer 10. The satellite communication system 66 may include communication satellites and an uplink transmitting station. Using the wireless carrier network, telematics system 50 may be connected to network 64 and, through network 64, to various computing devices 68 including servers and client computers. Computing devices 68 can be used for various purposes. In accordance with certain embodiments, computing devices 68 may include devices used by fleet managers to monitor and manage tractor-trailers 10 within a fleet and which are configured to receive diagnostic information and other vehicle data uploaded from tractor-trailer 10 and computing device 48 via the telematics system 50. According to one embodiment, network interface 54 is used for cellular communication according to either GSM, CDMA, UMTS or LTE standards and therefore includes a standard cellular chipset for voice communications, a wireless modem (not shown) for data transmission, and a radio transceiver that transmits signals to and receives signals from a dual antenna for wireless communication with network 60.

Network interface 56 communicates with network interface 54 and controller 58 and is configured for wireless connection to one or more local wireless devices in or near tractor-trailer 10 including computing device 48 to permit mobile computing devices to access telecommunications network 60 and vehicle communications bus 38 via network interface 54. Network interface 56 may comprise a wireless network interface controller having a radio transceiver that is configured for short range wireless communication using short-range wireless technologies such as Wi-Fi (IEEE 802.11), WiMAX, Wi-Fi direct, Bluetooth, Zigbee, near field communication (NFC), etc. and transmits and receives signals through an antenna. In certain embodiments, interface 56 may alternatively permit a wired connection with device 48 or other computing devices.

Controller 58 is provided to control and manage communications between network interfaces 54, 56. Controller 58 may include a variety of electronic processing devices, memory devices, input/output (I/O) devices, and/or other known components, and may perform various control and/or communication related functions. In an exemplary embodiment, controller 58 includes an electronic memory device that stores various look up tables or other data structures and software programs, etc. Controller 58 may also include an electronic processing device (e.g., a microprocessor, a microcontroller, an application specific integrated circuit (ASIC), etc.) that executes instructions for software, firmware, programs, algorithms, scripts, etc. that are stored in the memory device. Controller 58 may be a dedicated controller used only for telematics systems 50 or can be shared with other vehicle systems. Controller 58 may be electronically connected to vehicle control systems 18, 20, 22, 24, 26, 28, 30, 32, 34, 36 and other vehicle devices, modules and systems via vehicle communications bus 38.

Computing device 48 provides a means to guide the operator through the pre-trip inspection as well as an interface for communicating information between the operator and communications gateway 46 (and, through gateway 46, vehicle control systems 18, 20, 22, 24, 26, 28, 30, 32, 34, 36 and computing devices 68 under the control of the fleet manager). In certain embodiments, device 48 may comprise a mobile computing device. As used herein, the term "mobile computing device" refers to a device that (i) is configured to process data or information in accordance with a set of executable instructions; (ii) is portable (by a single person) and may be hand-held; (iii) can draw power from a battery or localized power source such that the device is not dependent on a wired connection to a power source external to the device; and (iv) is capable of at least short-range wireless communication (e.g., Wi-Fi Direct or Bluetooth) with other one of more telecommunications networks. In one embodiment, device 48 comprises a cellular phone. In other embodiments, device may comprise, for example, a tablet or laptop computer. Device 48 includes a memory 70 (e.g., non-transitory computer readable medium) that stores look up tables or other data structures and software programs and a programmable processor 72 with a central processing unit (CPU) that executes instructions for software, firmware, programs, algorithms, scripts, etc. that are stored in memory 70. Device 48 further includes an user interface 74 which may include various interface elements including a display configured to present a graphical user interface (GUI) to the operator of tractor-trailer 10, a keypad (e.g., push button and/or touch screen), a microphone, one or more speakers, a camera and motion-detection sensors (such as accelerometers, gyroscopes, etc.). In accordance with certain embodiments, device 48 may further include a global positioning system (GPS) receiver that receives signals from GPS satellites and can be used to determine the position of device 48. Device 48 may be configured to implement various software applications which may be preinstalled by the user (or manufacturer). In accordance with the present teachings device 48 may be programmed with appropriate programming instructions (i.e., software or a computer program) to implement a method for pre-trip inspection of tractor-trailer 10. The instructions or computer program may be encoded on a non-transitory computer storage medium such as a memory within, or accessible by, processor 72.

Figure 2:
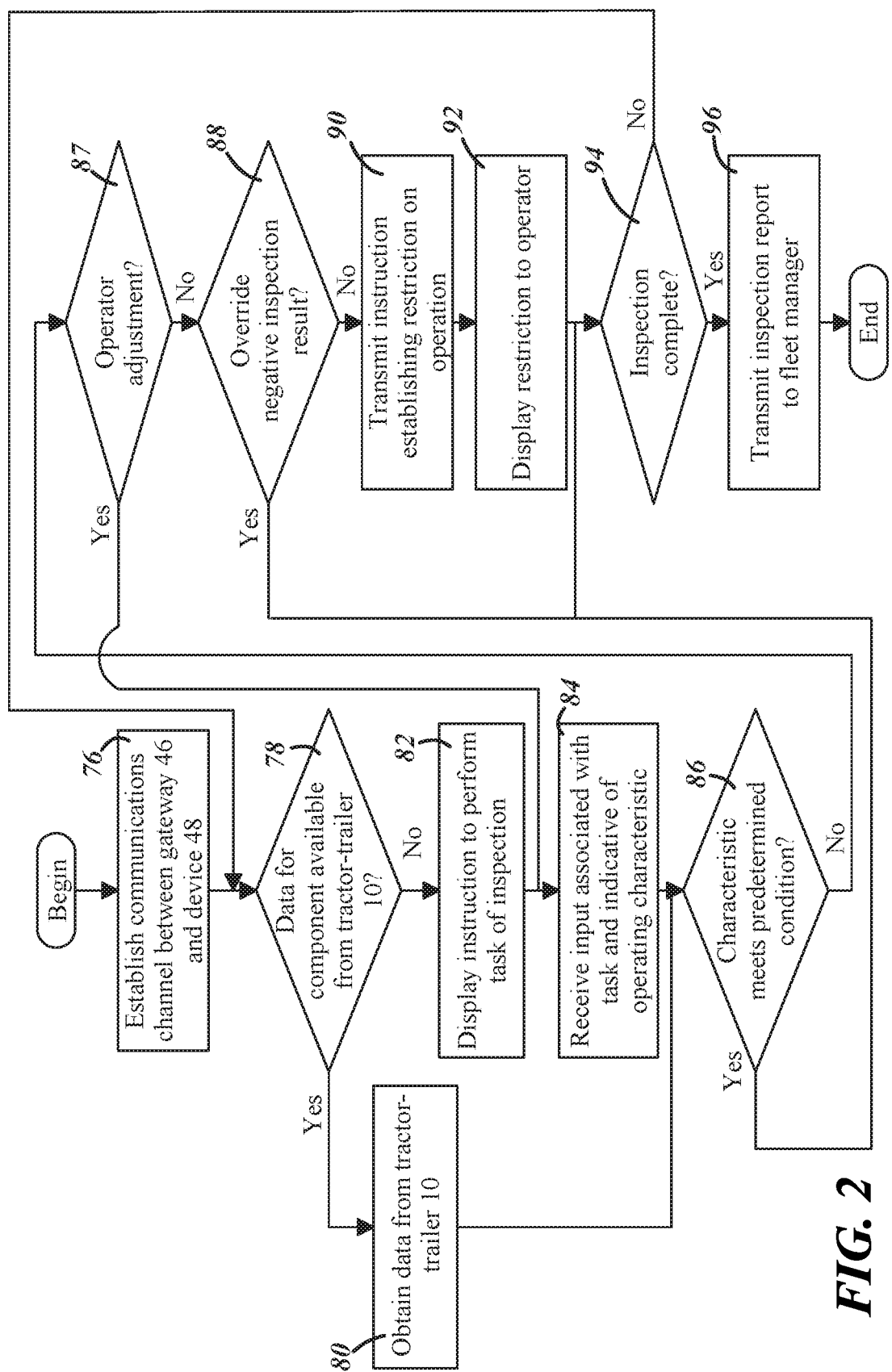
FIG. 2 is a flowchart illustrating one embodiment of a method for pre-trip inspection of a tractor-trailer.

Referring now to FIG. 2, one embodiment of a method for pre-trip inspection of tractor-trailer 10 may begin with the step 76 of establishing a communications channel between gateway 46 and device 48. The channel may be established in accordance with conventional protocols dependent on the communication methodology used by gateway 46 and device 48 and will preferably comprise short-range wireless communication (e.g., Wi-Fi (IEEE 802.11), WiMAX, Wi-Fi direct, Bluetooth, Zigbee, near field communication (NFC), etc.).

After establishing a communication channel between gateway 46 and device 48, the method may continue with a series of steps that are designed to generate an inspection of individual components or systems on tractor-trailer 10. In step 78, device 48 may determine whether tractor-trailer 10 generates data indicative of operating characteristics for a given component or system of tractor-trailer 10. As noted above, many vehicle control systems monitor the operation of individual components within tractor-trailer 10, perform diagnostic tests, and generate data including diagnostic trouble codes (DTCs) regarding the status of components of tractor-trailer 10. For example, bulb out detection system 32 monitors the operational status of external lights on tractor-trailer 10 and generates signals indicative of the status of the lights. Brake control system 24, and particularly the anti-lock braking system within brake control system 24, monitors the operational status of various components within the braking system and generates signals indicative of the status of these components. Device 48 may identify the presence of systems 24 and 32 (and other vehicle control systems) via the connection of device 48 to bus 38 through gateway 46 and extract data/information from the signals generated by systems 24, 32 (and other vehicle control systems). If tractor-trailer 10 generates data regarding a component or system of interest, device 48 may obtain that data in step 80 through gateway 46 and proceed to step 86 described hereinbelow.

If tractor-trailer 10 does not generate data regarding a component or system for which inspection is required or desirable or when a manual inspection of the component by the operator of tractor-trailer 10 is desirable, the method may continue with step 82 in which device 48 displays an instruction to the operator to perform a task associated with the pre-trip inspection. Device 48 will typically display the instruction on a display associated with device 48 and typically as part of a graphical user interface. The instruction may, for example, comprise an instruction to the operator of tractor-trailer 10 to enter data or information about a system or component of tractor-trailer 10 through a graphical user interface on device 48. The instruction may comprise an instruction to the operator to capture an image of a system or component of tractor-trailer 10. Device 48 may, for example, instruct the operator to take an image of a fluid dipstick or hose. The instruction may comprise an instruction to the operator to capture a video of a system or component of tractor-trailer 10. Device 48 may, for example, instruct the operator to capture an image of the operation of a turn signal on tractor-trailer 10. The instruction may comprise an instruction to the operator to capture an audio recording of a system or component of tractor-trailer 10. Device 48 may, for example, instruct the operator to capture an audio recording of a horn on tractor-trailer 10. Each instruction may include multiple steps including steps that direct the operator to perform a physical movement (e.g., activating a turn signal or sounding a horn). Each instruction may further include a variety of information relating to the instruction including the location of the component or system, the reasons an inspection is necessary or desirable, etc.

The method may continue with the step 84 wherein device 48 receives an input associated with the task from the operator. The input may comprise text entered by the operator through a graphical user interface on device 48 using a keyboard, touch screen or other input device. The input may comprise an image, or a sequence of images (i.e., a video), captured by the operator using a camera on, or connected to, device 48. The input may comprise an audio recording captured by the operator using a microphone on device 48. If the received input is insufficient in quality, device 48 may provide additional instructions to the operator to obtain a more usable input including repeating step 82. These instructions may include, for example, cleaning of a component of interest or making positional or lighting adjustments to improve image/video quality or mitigating nearby sounds to improve audio quality. In addition to performing any instruction given in step 82 to obtain required information, the operator may insert additional information such as notes from observations made by the operator. Provided that the operator has properly followed the instruction from step 82, the input will be indicative of an operating characteristic of tractor-trailer 10 and, in particular, a component or system of tractor-trailer 10. The operating characteristic may, for example, relate to the presence or absence of a component or system on tractor-trailer 10 or the operation of a component or system.

In step 86, device 48 may determine whether the operating characteristic of a given component or system in tractor-trailer 10 obtained in step 80 or 84 meets a predetermined condition. In other embodiments, step 86 may be performed by another computing device such as device 68 after transmission of the input received in step 84 from device 48 to device 68 through telematics system 50 or, where device 48 is capable of long-range wireless communication (e.g., cellular or satellite communication), directly through network 60 without use of telematics system 50. The nature of the condition will depend on the component or system being inspected. In some circumstances, the condition may be that component or system is present on tractor-trailer 10. For example, the inspection may be designed to verify the presence of certain safety components or safety systems on tractor-trailer 10 such as a stability control system 28 or a particular collision avoidance system 34. In other circumstances, the condition may be that a system or component is operational. For example, the inspection may be designed to verify that exterior lights illuminate when required, that a turn signal blinks on and off, or that a horn produces a sound. In other circumstances, the condition may be that a fluid level is at or above a predetermined fluid level or that a distance between two parts is greater than or less than (depending on the nature of the component or system) a predetermined distance. If the operating characteristic for a given component or system in tractor-trailer 10 meets the predetermined condition, the component or system may be considered to pass inspection and the method may proceed to step 94 discussed hereinbelow.

If the operating characteristic for a component or system in tractor-trailer 10 fails to meet the predetermined condition, the method may continue with the step 87 in which the operator of tractor-trailer 10 is provided with an opportunity to make adjustments that alter the value of the operating characteristic of tractor-trailer obtained in step 84. For example, in the case of a component having a fluid level below a predetermined minimum level, the operator may add additional fluid. Device 48 may provide an indication to the operator that the component or system has failed to meet the predetermined condition and may further provide an indication to the operator of any restriction that may be implemented on operation of the vehicle has a result of the failure. If the operator makes an adjustment to tractor-trailer 10, the method may return to step 84 wherein the operator enters a new, updated input indicative of the adjusted operating characteristic of the vehicle.

If the operating characteristic for a component or system in tractor-trailer 10 fails to meet the predetermined condition in step 86 and the operator does not make any adjustments to tractor-trailer 10 in step 87, the method may continue with the step 88 in which a determination may be made by a fleet operator or manager for tractor-trailer 10 whether to ignore the negative inspection result. Step 88 may include several substeps. Step 88 may begin by transmitting the negative inspection result to a computing device 68 managed by a fleet operator or manager. Device 48 may transmit the inspection result to device 68 through telematics system 50. Alternatively, where device 48 is capable of long-range wireless communication (e.g., cellular or satellite communication), device 48 may transmit the inspection result to device 68 through network 60 without use of telematics system 50. Step 88 may continue by receiving an instruction from computing device 68 regarding handling of the negative inspection result. If the fleet manager chooses to ignore the negative inspection result, the instruction from computing device 68 will cause device 48 to bypass step 90 discussed hereinbelow (thereby preventing transmission of any instructions imposing restriction on operation of tractor-trailer 10) and proceed to step 94 discussed hereinbelow. If the fleet manager believes action is required in response to the negative inspection result, the method proceeds to step 90. In the event of a failure to respond by the fleet operator or manager, device 48 may be configured to proceed to step 90 or 94 directly after a predetermined period of time has passed without receiving a command from computing device 68.

In step 90, device 48 transmits an instruction to one or more vehicle control systems on tractor-trailer through gateway 46 that establish restrictions on the operation of tractor-trailer 10. Device 48 may transmit the instructions through gateway 46 and on communications bus 38. Step 90 may include several substeps. Device 48 may begin by identifying an appropriate restriction based on the component or system of interest. In identifying the appropriate restriction, device 48 may be configured to take into account a variety of factors beyond the failure of an operating characteristic of the component or system to meet the predetermined condition. For example, device 48 may identify a restriction based on whether or not the operating characteristic for the component or system has failed to meet the predetermined conditions on prior occasions and the number of times the operating characteristic has failed to meet the predetermined condition. In addition, or alternatively, device 48 may identify a restriction based on whether or not the operating characteristics of multiple, interrelated components or systems have failed to meet corresponding predetermined conditions. In addition, or alternatively, device 48 may identify a restriction based on the degree to which an operating characteristic of a component or system has failed to meet a predetermined condition (e.g., whether a fluid level is slightly below or far below a predetermined fluid level). In this respect, device 48 may select from among varying levels of restriction on the operation of tractor-trailer 10. Using the above information, device 48 implement a programmed algorithm or may access a look up table or other data structure to obtain an appropriate restriction. The algorithm or data structure may reside in memory 70 on device 48 or may be obtained from a remote computing device 68 accessed over network 60 through telematics system 50 or directly by device 48. In one embodiment, device 48 may select from a range of possible restrictions, one or more of which places a limitation on movement of tractor-trailer 10. The limitations may include preventing movement of tractor-trailer 10, allowing tractor-trailer 10 to operate in "limp home" mode in which engine power is limited, placing a limit on the maximum speed for tractor-trailer 10, preventing platooning among multiple tractor-trailers 10, allowing tractor-trailer 10 to engage in platooning, but only as the lead vehicle, and permitting platooning, but preventing full autonomous driving in tractor-trailers 10 having that capability. Device 48 may also instruct tractor-trailer 10 to implement other restrictions including limiting the number of trailers 16 or load, limiting use of certain gears in transmission control system 20, adjusting parameters for braking in braking system 24 or for warnings in collision avoidance system 34, adjusting the permitted following distance in adaptive cruise control system 30 or preventing navigation system 46 from recommending routes that include significant curves or changes in elevation. It should be understood that the list of restrictions set forth above is exemplary. Once an appropriate restriction is identified, device 48 transmits an instruction through gateway 46 to an appropriate vehicle control system such as one of systems 18, 20, 22, 24, 26, 28, 30, 32, 34, 36 in tractor-trailer 10. It should be understood that the instruction and restriction from device 48 may be directed to a vehicle control system that is not directly related to the component or system being inspected. For example, a negative inspection result for a component of brake control system 24 may result in a restriction on operation of the engine in engine control system 20.

Device 48 may also be configured, in step 92, to display an indication of the restriction to the user. Device 48 may notify the operator of the existence and/or nature of the restriction in a variety of ways including through an indication on a display screen of device 48. Although step 92 is shown as occurring after step 90 in the embodiment of FIG. 2, it should be understood that 92 could be performed contemporaneously with step 90.

In step 94, device 48 determines whether the inspection is complete. In the case of a comprehensive, pre-defined pre-trip inspection, device 48 may determine in step 94 whether the current component or system under inspection is the final component or system designated for inspection within a pre-defined inspection routine. If not, the method may return to the step 78 and repeat steps 78 through 92 for the next component or system. If the current component or system is the final component or system designated for inspection, method may continue with the step 96. In the case of a diagnostic inspection (e.g., due to a suspected failure of a specific component or system) the operator may indicate that the inspection will be limited to one or more specific components or systems through interface 74 on device 48 after the communications channel is established in step 76. In such an embodiment, device 48 may determine in step 94 whether the inspection of the current component or system designated for inspection by the operator is the final component or system designated for inspection by the operator. If not, the method may return to step 78 and repeat steps 78 through 92 for the next component or system designated by the operator. If the current component or system is the final component or system designated for inspection by the operator, the method may continue with step 96. In step 96, an inspection report is transmitted to computing device 68 over network 60. Device 48 may transmit the report through telematics unit 50 or may again transmit the report directly to device 68 if device 48 is capable of long-range wireless communication. In addition to information or data gathered from operator inputs in step 84, determinations in step 86 and the nature of any restrictions implemented in step 90, the report may include information regarding the location of tractor-trailer 10, the date and time of the inspection, the vehicle identification number (VIN) or other identifying information regarding tractor-trailer 10 and identifying information for the individual performing the pre-trip inspection. In the embodiment illustrated in FIG. 2, the steps are performed in succession for a single component or system and then repeated for additional components or systems. It should be understood, however, that the steps could be performed in a different order. For example, in another embodiment, device 48 could be configured to perform 82, 84 for each component before performing step 86 or any subsequent step for any individual component.

During performance of the method in FIG. 2, device 48 may also be configured to monitor the location of the operator relative to a location of the vehicle as the inspection is performed to insure a proper inspection. In particular, device 48 may monitor the location of the operator by monitoring the position of device 48 using a GPS receiver on device 48 in order to ensure that the inspection is being completed in a predetermined order and/or within a predetermined timeframe. Device 48 may be further configured to determine whether the location of the operator meets a predetermined condition (e.g., is at a predetermined location, is at a predetermined distance from the vehicle and/or has traveled over a predetermined distance and/or within a predetermined time) and, when the location does not meet the predetermined condition (thereby indicating a failure to perform some aspect of the inspection), to transmit an instruction to one of the vehicle control systems 18, 20, 22, 24, 26, 28, 30, 32, 34, 36 through gateway 46 to establish a restriction on operation of tractor-trailer 10 including one or more of the restrictions set forth above. Device 48 may further transmit a notification regarding the improper inspection to a computing device 68 of the fleet manager or operator through network 60 either directly or through telematics system 50. The notification may be included in the inspection report transmitted in step 96. In addition to performing these actions (transmitting instructions to the tractor-trailer restricting operation and/or transmitting notifications to the fleet manager or operator) based on movements of the operator, these actions may be performed based on other indicators of an improper inspection including input text that does not make sense in context to the particular task, a recorded image or video that does not show the component of system of interest or cannot be processed due to image quality or other issues, or an audio recording with too much noise from the surrounding environment, etc.

Figure 3:
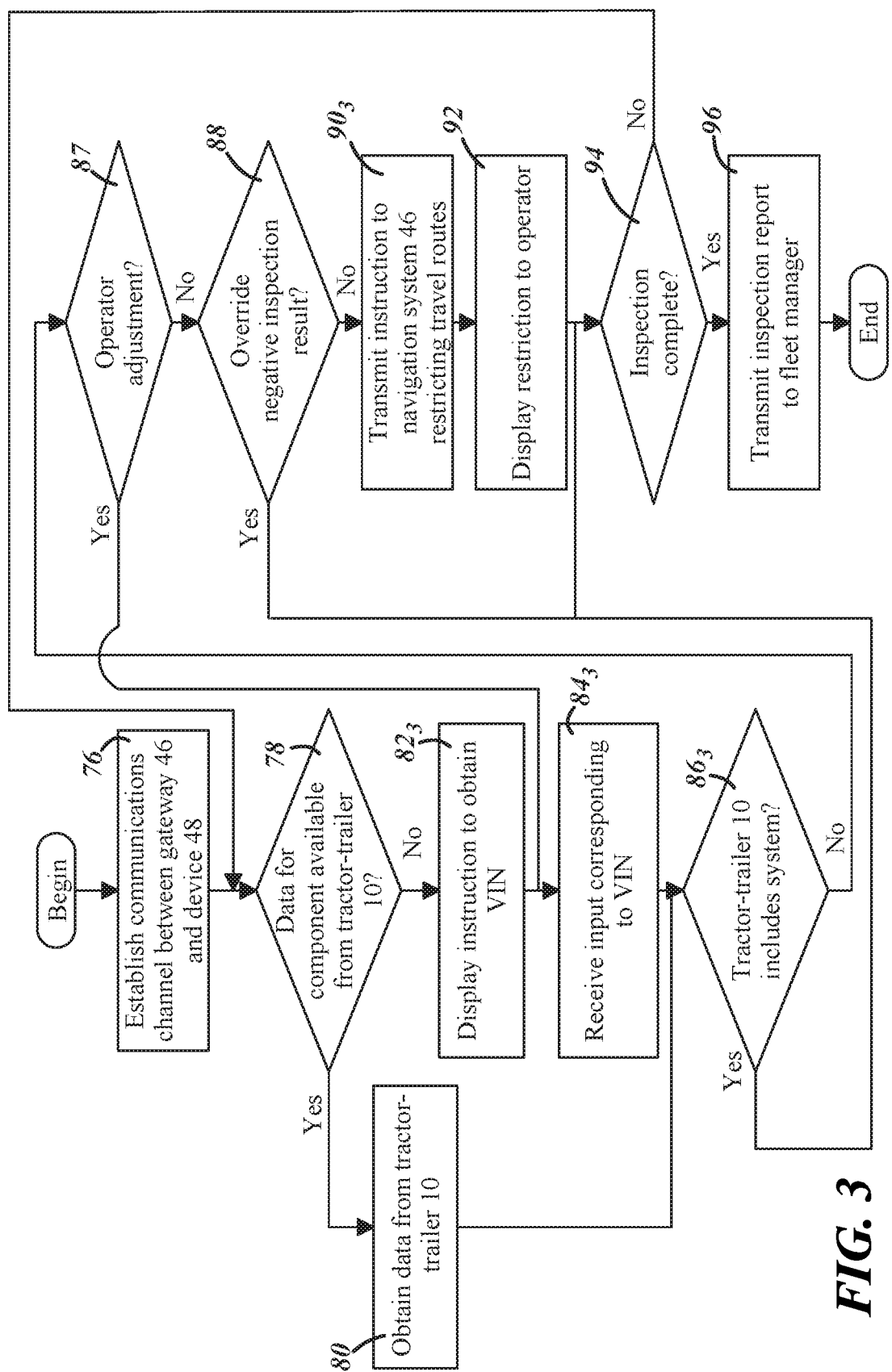
FIGS. 3-7 are flowcharts illustrating more specific embodiments of the method of FIG. 2.

Referring now to FIGS. 3-7, several more specific embodiments of the method for pre-trip inspection of tractor-trailer 10 are shown. Referring to FIG. 3, in one embodiment, device 48 may instruct the operator in step $82_3$ to obtain the vehicle identification number (VIN) for tractor-trailer 10 and, subsequently, in step $84_3$, receive an input corresponding to the VIN. Device 48 may instruct the operator to enter the VIN through a graphical user interface on display 48 using an input device such as a keyboard or touch screen. Alternatively, device 48 may instruct the operator to capture an image of the VIN on tractor-trailer 10 using a camera on or connected to device 48 and then may process the image to retrieve the VIN. Referring again to FIG. 2, it should also be understood that the VIN could potentially be obtained directly from information available on the vehicle communications bus 38 in steps 78, 80. The VIN may be indicative of various operating characteristics of tractor-trailer 10 including the type of tractor-trailer 10 and the presence or absence of various vehicle control systems on tractor 14. Information linking the VIN to information regarding tractor 14 may be maintained in a data structure in a memory accessible by device 48 including locally on device 48 or, more likely, on a remote computing device 68 accessible through network 60 either directly by device 48 or through telematics system 50. Referring again to FIG. 3, in step $86_3$, device 48 may determine based on the VIN whether tractor-trailor 10 includes certain components or systems. For example, device 48 may determine whether tractor-trailer 10 includes stability control system 28. If tractor-trailer 10 does not include stability control system 28, device 48 may transmit an instruction to tractor-trailer 10 in step $90_3$ through gateway 46 that establishes a restriction on the operation of tractor-trailer 10. In one embodiment, device 48 may transmit an instruction to navigation system 46 that prevents system 46 from recommending a travel route having roads having a relatively high number or degree of curves or a relatively large change in elevation. In another embodiment, device 48 may determine in step $86_3$ whether tractor-trailer 10 includes a functioning hill start assist system. If tractor-trailer 10 does not include a functioning hill start assist system, device 48 may transmit an instruction in step $90_3$ to navigation system 46 that prevents system 46 from recommending a travel route having roads having a relatively large change in elevation.

Figure 4:
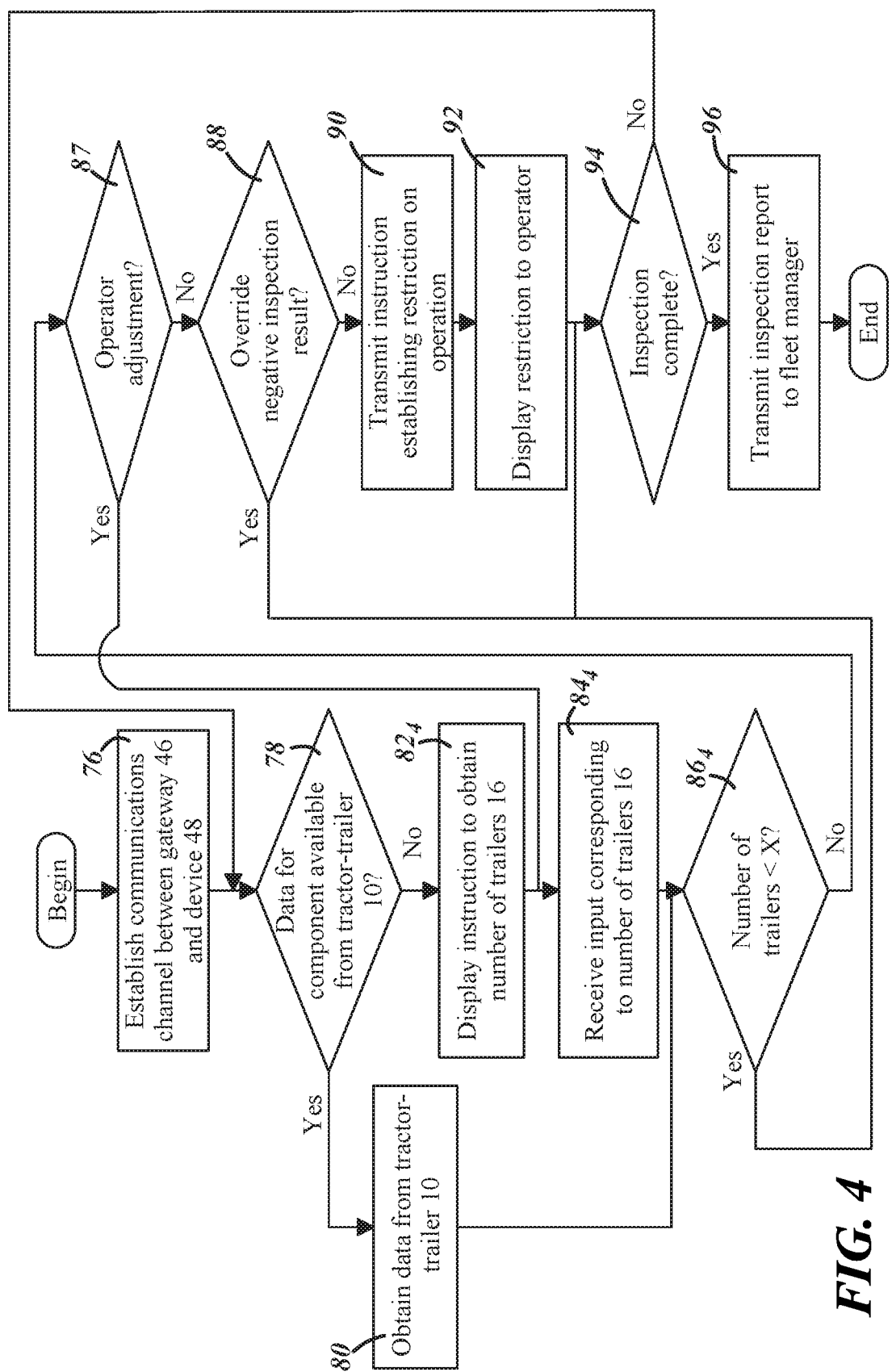

Referring to FIG. 4, in another embodiment, device 48 may instruct the operator in step $82_4$ to enter the number of trailers 16 for tractor-trailer 10 and, subsequently, in step $84_4$, receive an input corresponding to the number of trailers 16. Device 48 may instruct the operator to enter the number of trailers 16 through a graphical user interface on display 48 using an input device such as a keyboard or touch screen. Alternatively, device 48 may instruct the operator to capture an image of the tractor-trailer 10 using a camera on or connected to device 48 and then may process the image to retrieve the number of trailers 16. In step $86_4$, device 48 may determine whether the number of trailers 16 meets a predetermined condition (e.g., is equal to a predetermined number or is greater than or less than a predetermined number). If device 48 determines that the number of trailers 16 does not meet the predetermined condition, device 48 may transmit an instruction to tractor-trailer 10 in step 90$_4$ through gateway 46 that establishes a restriction on the operation of tractor-trailer 10. In one embodiment, device 48 may transmit an instruction to cruise control system 30 or another vehicle system that may be used to implement limitations on platooning with other tractor-trailers 10. Device 48 may alternatively transmit instructions to brake control system 24 to adjust various control parameters for system 24. In addition to establishing restrictions on tractor-trailer 10, the number of trailers input in step 84$_4$ may be used in other ways including, for example, in adjusting the scope of the pre-trip inspection to increase or decrease the number of components requiring inspection.

Figure 5:
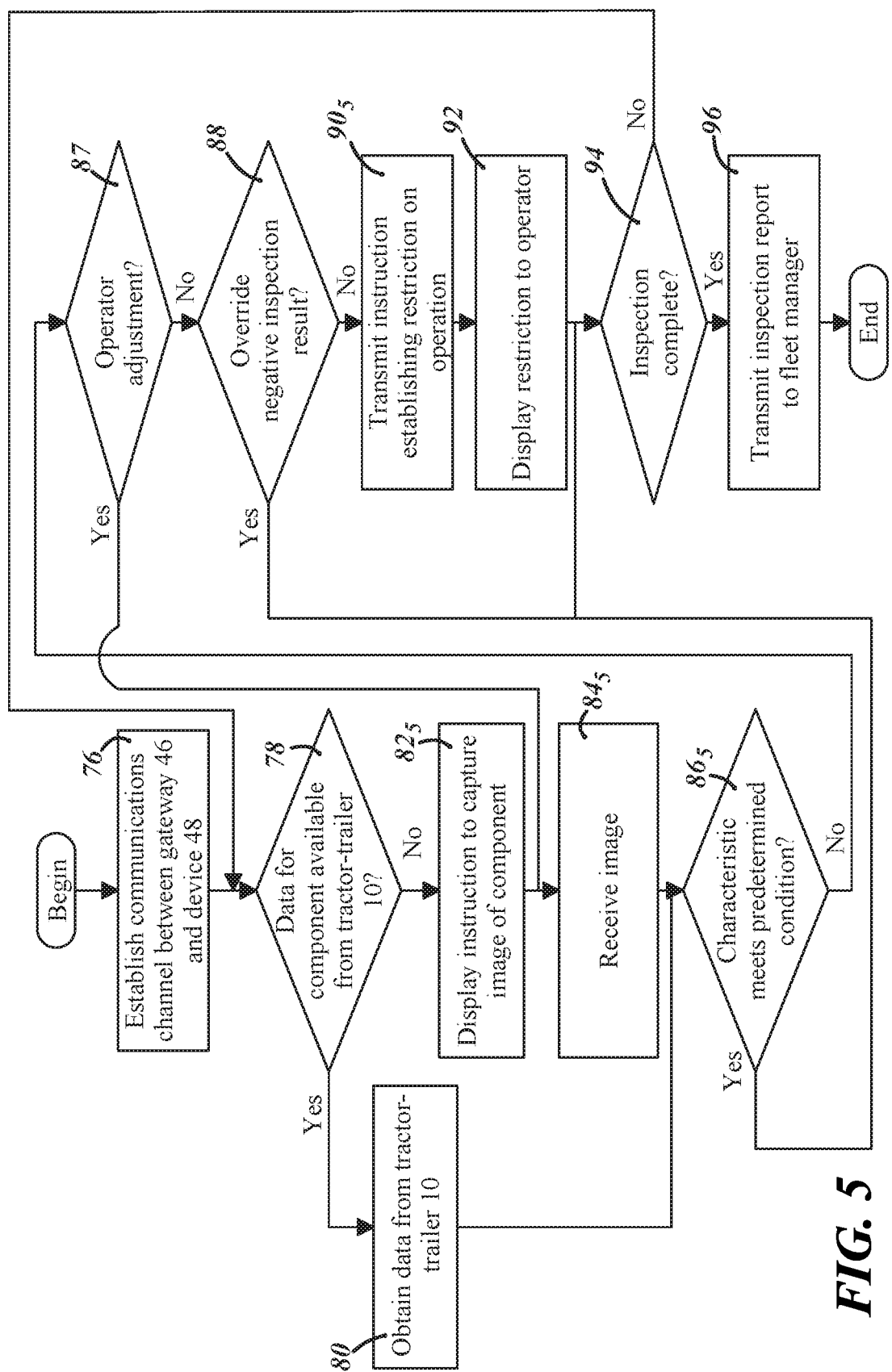
Figure 8A:
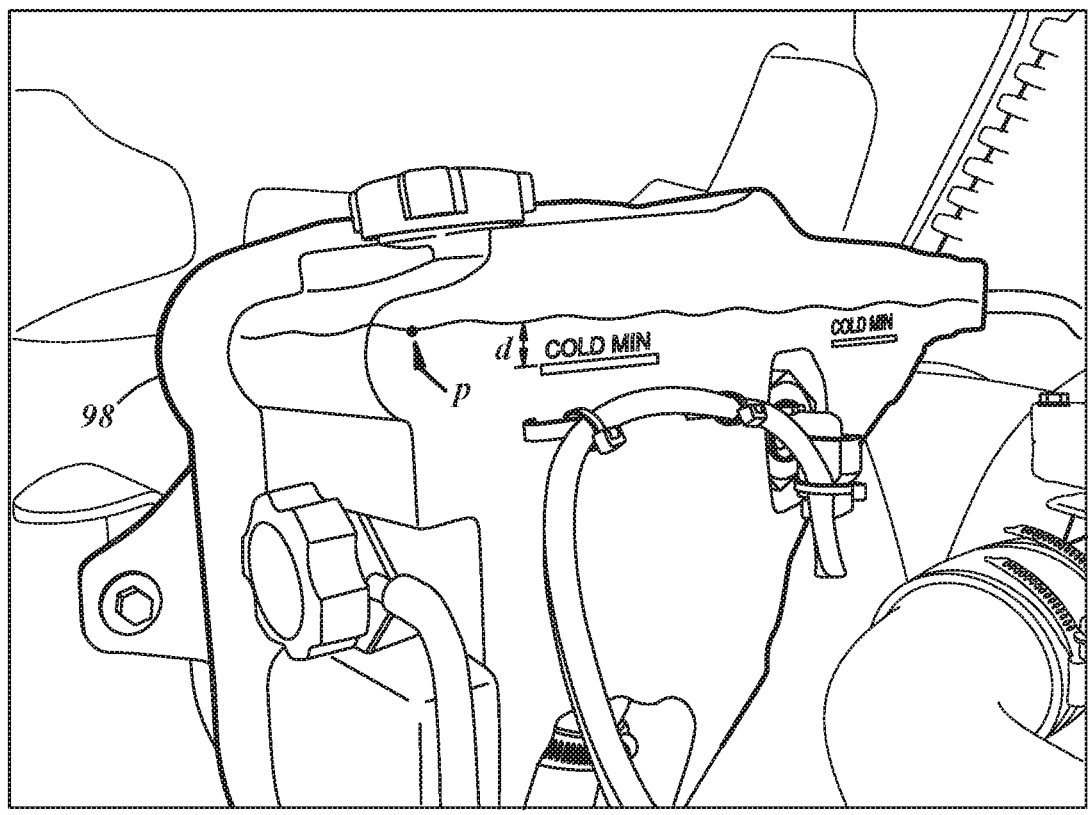
FIGS. 8A-8E are screen displays relating to the method embodiment of FIG. 5.
Figure 8B:
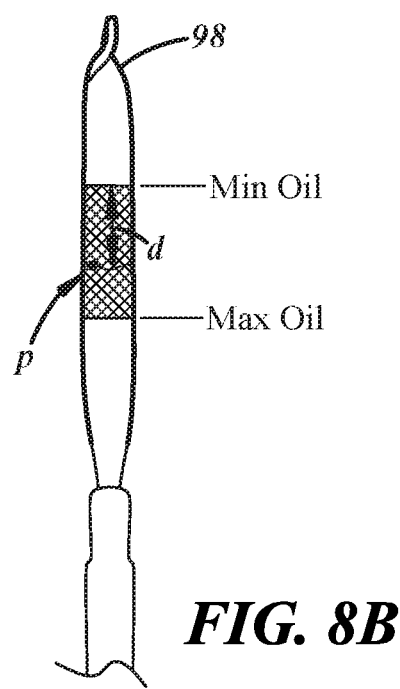
Figure 8C:
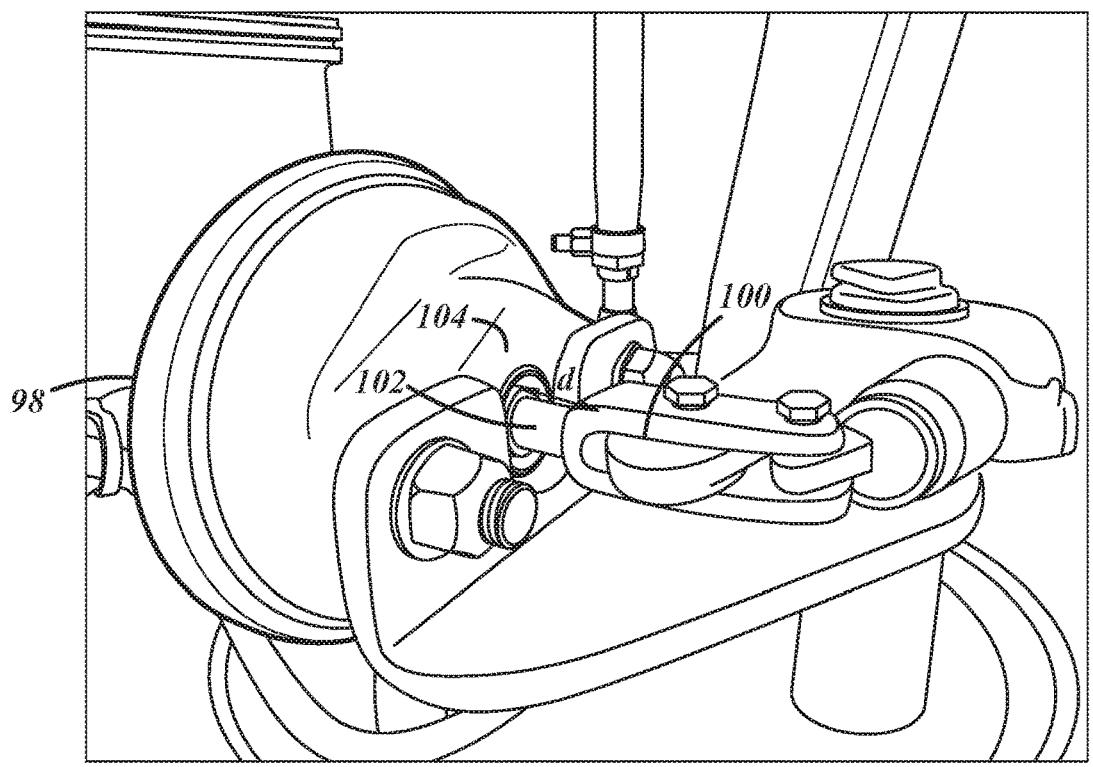
Figure 8D:
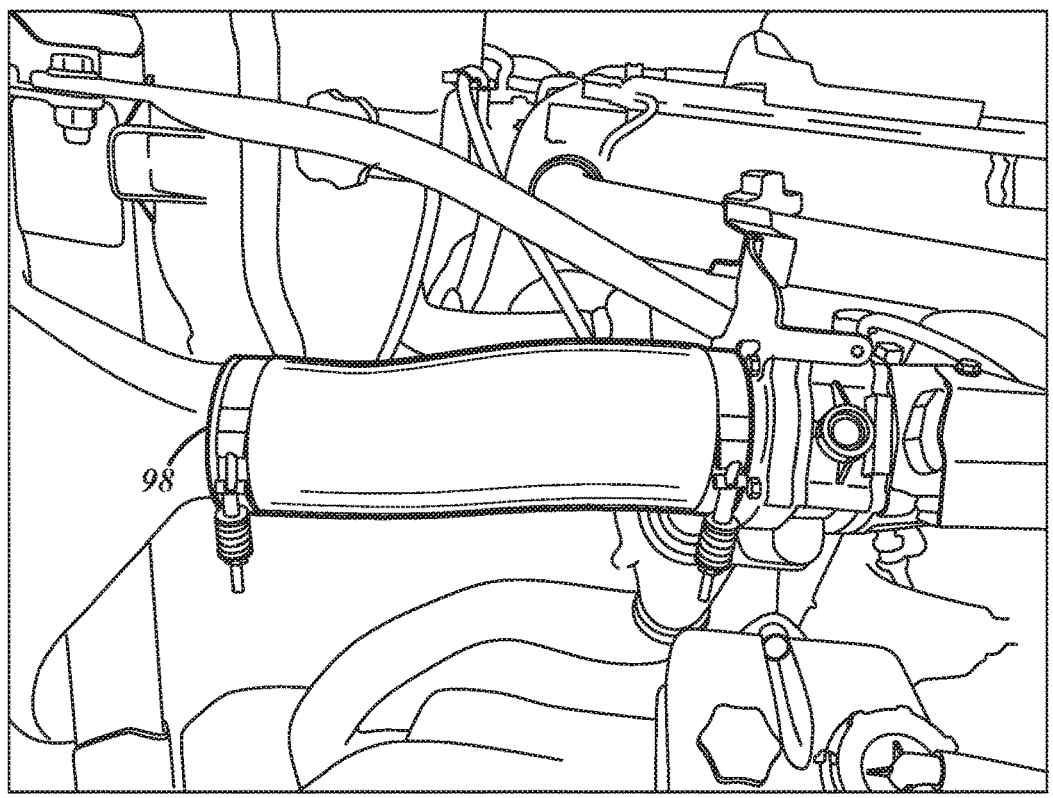
Figure 8E:
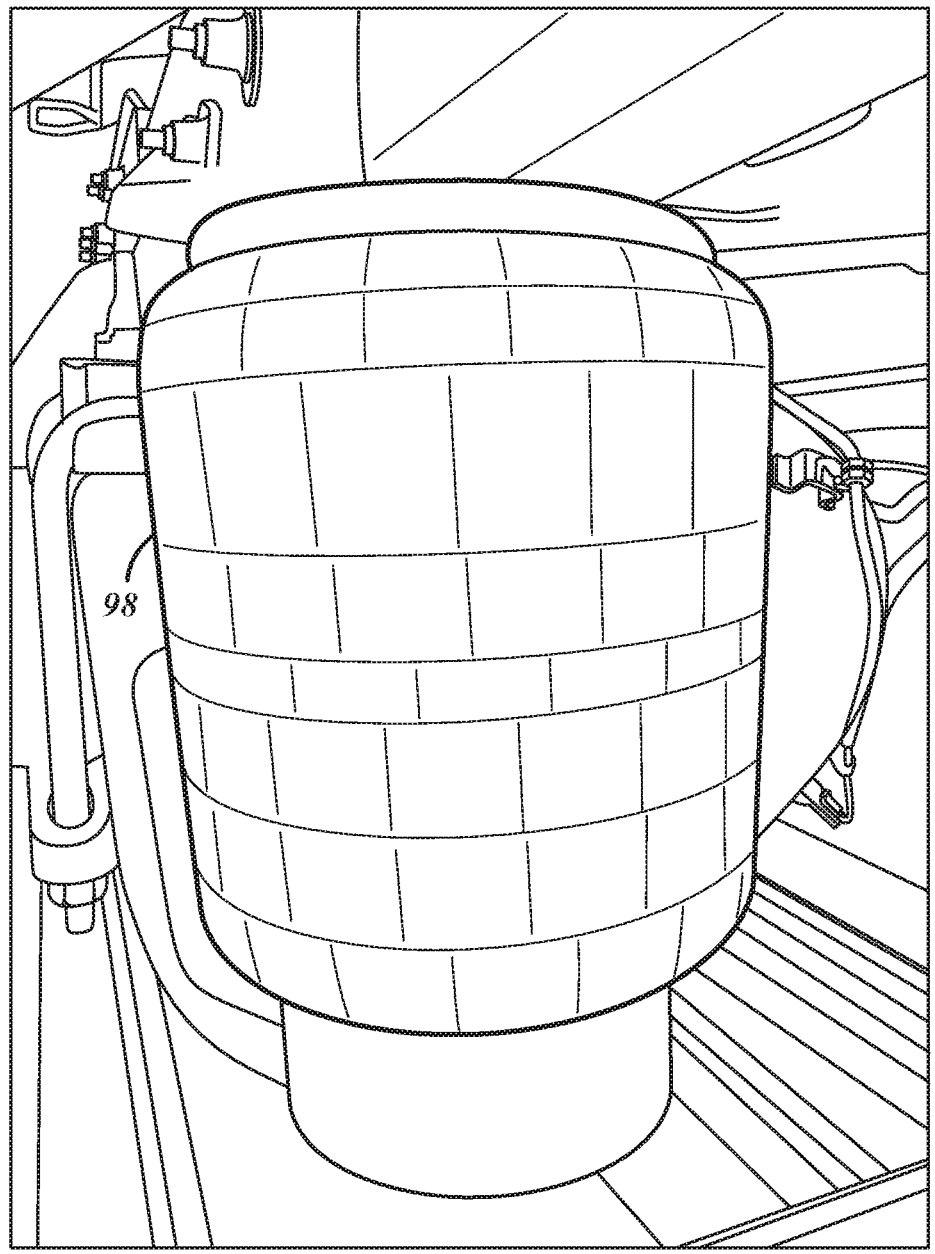

Referring to FIG. 5, in another embodiment, device 48 may instruct the operator in step 82$_5$ to capture an image of a component or system of tractor-trailer 10 and, subsequently, in step 84$_5$, to receive an image generated by the operator using device 48 indicative of an operating characteristic of the component or system. Referring to FIGS. 8A-8E, in accordance with one aspect of the system and method disclosed herein, device 48 may be configured in step 82$_5$ to generate a visual overlay 98 for a component of tractor-trailer 10 and, in step 84$_5$, to capture an image of the component once the overlay 98 and the component are aligned on a display of device 48. Device 48 may recognize alignment of the overlay 98 and component of interest by processing the image shown in the display including analysis of open space (or lack thereof) between the overlay 98 and component based on colors, etc. The visual overlay 98 may, for example, comprise a fitted outline for a component as shown in FIGS. 8A-8E, or a transparent image of the entire component. The visual overlay 98 is intended to ensure that the image captured by the operator in step 82$_5$ and received by device 48 in step 84$_5$ is configured for subsequent image processing by device 48 (e.g., has an appropriate size, angle of view and depth) so that the desired operating characteristic of the tractor-trailer 10 can be identified from the image. Referring again to FIG. 5, the method may continue with the step 86$_5$ of determining whether the operating characteristic of tractor-trailer 10 identified in the image meets a predetermined condition. Referring to FIGS. 8A-8C, in one embodiment, device 48 may identify a distance d between two points on the component shown in the image and compare that distance to a predetermined distance or may identify a position of a point of interest p on the component in the image and compare that position to a predetermined position. This action may be useful, for example, in determining whether a fluid level is at an appropriate level. In the case of engine coolant (FIG. 8A), transmission fluid, lubricants (FIG. 8B), etc., device 48 may process the image to determine a distance between a first point on the image and a point on the image indicative of the fluid level and compare that distance to a predetermined distance to determine whether the fluid level is at an acceptable level or identity a position of a point on the image indicative of the fluid level and compare that position to a predetermined position. The comparison may also be useful in determining whether a component is an acceptable position. Referring to FIG. 8C, in the case of a brake slack adjuster 100, for example, device 48 may process the image to determine a distance along a pushrod 102 of a brake actuator between the brake actuator housing 104 and slack adjuster 100 and compare this distance to a predetermined distance to determine whether the slack adjuster 100 is in an acceptable position. Alternatively, device 48 may process the image to identify a position of a point on the slack adjuster within the image and compare that position to a predetermined position to determine whether the slack adjuster is at an appropriate position. Referring to FIGS. 8D-8E, in another embodiment, device 48 may be configured in step 86$_5$ to compare the image captured in step 82$_5$ and received in step 84$_5$ to one or more previously obtained images. This action may be useful, for example, in determining whether one or more components shows signs of undesirable levels of wear or damage. In the case of a hose (FIG. 8D) or air bag (FIG. 8E), device 84 may compare the captured image to stored images to identify differences in color that are indicative of cracks or other forms of wear or damage. Visual overlays 98 for a tractor-trailer 10 are specific to a tractor-trailer 10 and may, for example, be downloaded by device 48 from a remote computing device 68 either directly or through telematics system 50 using the VIN for the tractor-trailer 10 which may be obtained by device 48 in the manner set forth above in the description of FIG. 3.

If device 48 determines in step 86$_5$ that the operating characteristic of tractor-trailer 10 does not meet a predetermined condition (e.g., that a fluid level is less than predetermined minimum fluid level or that a component has an undesirable opening), device 48 may apply an appropriate restriction in step 90$_5$ including one or more of the restrictions identified hereinabove.

Figure 6:
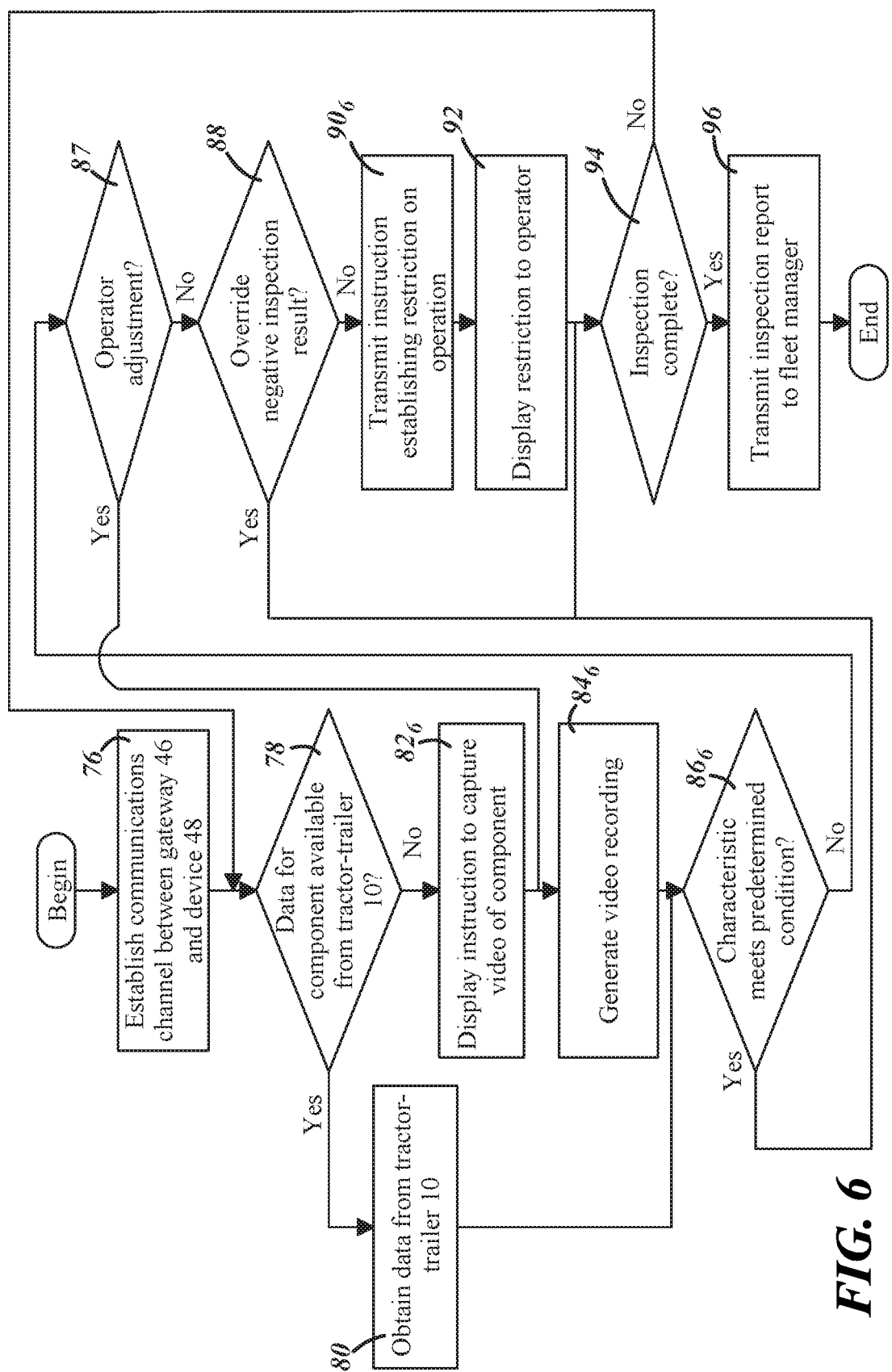

Referring to FIG. 6, in another embodiment, device 48 may instruct the operator in step 82$_6$ to capture a video of a component or system of tractor-trailer 10 during operating of the component or system and, subsequently, in step 84$_6$, generate a video recording based on actions of the operator during operation of the component or system. The video will include information indicative of an operating characteristic of the component or system. For example, device 48 may instruct the operator to capture video showing operating of a turn signal of the tractor-trailer 10 to indicate whether the turn signal is operating properly. In step 86$_6$, device 48 may determine whether an operating characteristic of the turn signal (e.g., that the signal is blinking on and off and/or that the signal is blinking on and off at a desired frequency) meets a predetermined condition (e.g., is blinking and/or is blinking at above a predetermined frequency). Device 48 may make this determination by comparing a plurality of frames in the video recording in which changes in color or brightness in one or more pixels of the image is indicative of an on or off state of the turn signal. If device 48 determines in step 86$_5$ that the operating characteristic of tractor-trailer 10 does not meet a predetermined condition (e.g., that the turn signal is not blinking on and off or is doing so at too low a frequency), device 48 may apply an appropriate restriction in step 90$_6$ including one or more of the restrictions identified hereinabove.

Figure 7:
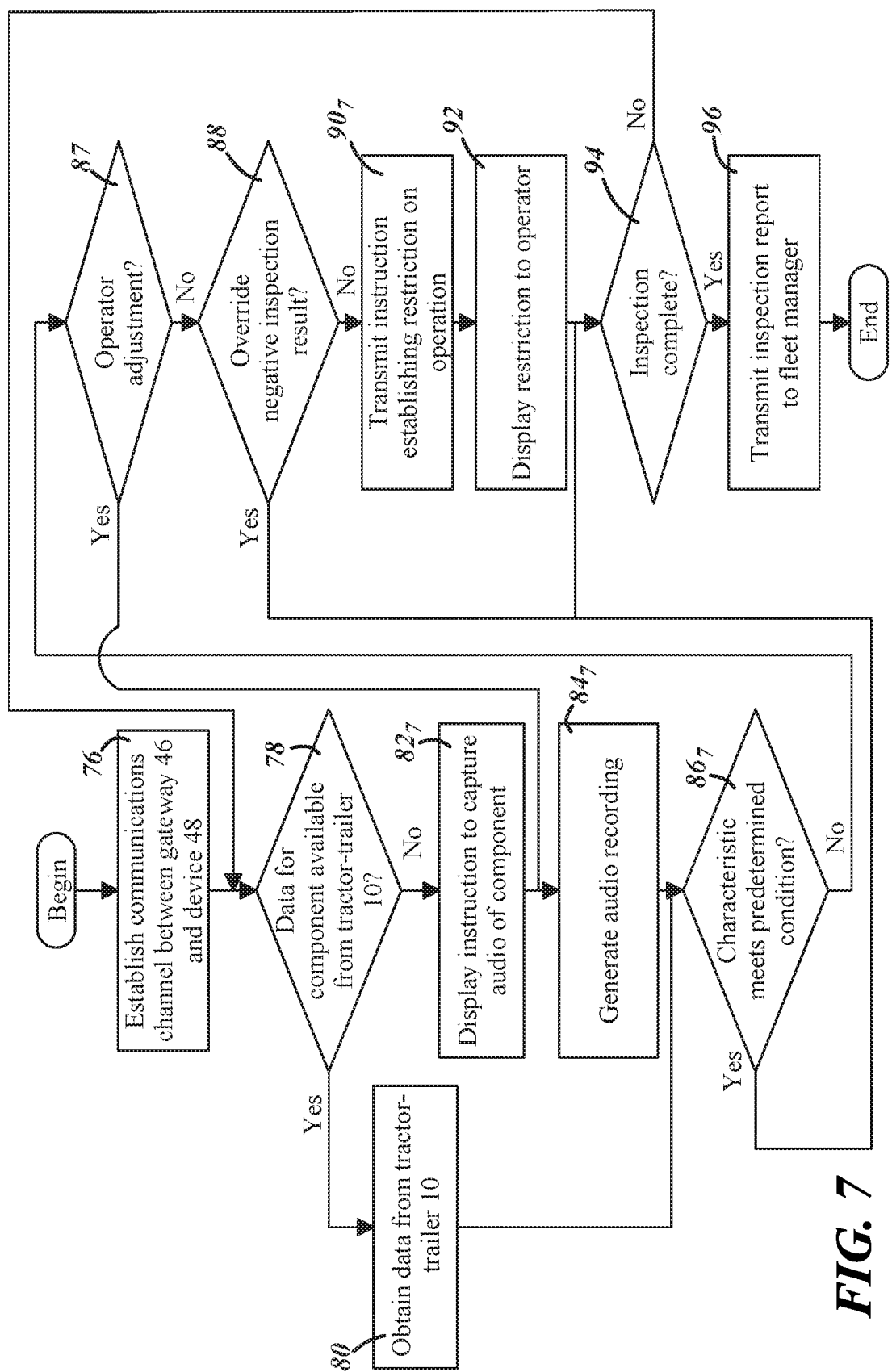

Referring to FIG. 7, in another embodiment, device 48 may instruct the operator in step 82$_7$ to capture an audio recording of a component or system of tractor-trailer 10 during operating of the component or system and, subsequently, in step 84$_7$, generate an audio recording based on actions of the operator during operation of the component or system. The audio recording will include information indicative of an operating characteristic of the component or system. For example, device 48 may instruct the operator to capture audio evidencing operation of a horn of the tractor-trailer 10 to indicate whether the horn is operating properly. Because sound is dependent on distance, device 48 may be configured to monitor the location of device 48 and to verify that location meets a predetermined condition (e.g., in the cabin of tractor 14 or within a certain distance of tractor-trailer 10) when the audio recording is generated. Device 48 may monitor its location using a GPS receiver on device 48. When the location of device 48 does not meet the predetermined condition, device 48 may, for example, be configured to display an instruction to the operator to move device 48 to a different location and repeat the task, transmit an instruction to one of the vehicle control systems 18, 20, 22, 24, 26, 28, 30, 32, 34, 36 through gateway 46 to establish a restriction on operation of tractor-trailer 10, or transmit a notification regarding the improper inspection to a computing device 68 of the fleet manager or operator through network 60 either directly or through telematics system 50. In step 86$_7$, device 48 may determine whether an operating characteristic of the horn (e.g., that the horn is making a sound and/or that the horn is sufficiently loud) meets a predetermined condition (e.g., is making a sound and/or is making a sound above a predetermined decibel level). Device 48 may make this determination by comparing the audio recording to one or more pre-recorded audio recordings of the horn. If device 48 determines in step 86$_7$ that the operating characteristic of tractor-trailer 10 does not meet a predetermined condition (e.g., that the horn is not making a sound and/or is not making a sound that is sufficiently loud), device 48 may apply an appropriate restriction in step 90$_7$ including one or more of the restrictions identified hereinabove.

A system 12 and method for pre-trip inspection of a tractor-trailer 10 in accordance the present teachings represent an improvement as compared to conventional systems and methods. The system 12 and method improve the efficiency of the pre-trip inspection. The increased efficiency improves operator satisfaction and operator retention for fleet operators. Because operators are more likely to adhere to inspection requirements, the system 12 and method reduces potential safety hazards and legal violations. The system 12 and method also result in a more coherent organization of information from pre-trip inspections and rapid communication of the information to fleet operators. The system 12 and method also automatically implement restrictions on operation of the tractor-trailer 10 in response to issues identified during the inspection, preventing vehicle operators from ignoring issues and leading to consistent standards of operation within fleets.

While the invention has been shown and described with reference to one or more particular embodiments thereof, it will be understood by those of skill in the art that various changes and modifications can be made without departing from the spirit and scope of the invention.

What is claimed is:

1. A system for pre-trip inspection of a tractor-trailer, comprising:
    a communications gateway configured for electronic communication with a first vehicle control system of the tractor-trailer;
    a computing device configured for communication with the first vehicle control system of the tractor-trailer through the communications gateway, the computing device further configured to
        display an instruction to a user to perform a first task of the pre-trip inspection;
        receive an input associated with the first task from the user, the input indicative of a first operating characteristic of the tractor-trailer; and,
        transmit, when the first operating characteristic does not meet a first predetermined condition, a first instruction to the first vehicle control system through the communications gateway, the first instruction establishing a first restriction on operation of the tractor-trailer
    wherein the computing device is further configured, in displaying the instruction, to generate a visual overlay for a component of the tractor-trailer and, in receiving the input, to capture an image of the component once the overlay and the component are aligned on a display of the computing device.

2. The system of claim 1 wherein the computing device is further configured to determine whether the first operating characteristic meets the first predetermined condition by identifying a distance between two points on the component in the image and comparing the distance to a predetermined distance.

3. The system of claim 1 wherein the computing device is further configured to determine whether the first operating characteristic meets the first predetermined condition by identifying a position of a point on the component in the image and comparing the position to a predetermined position.

4. The system of claim 1 wherein the computing device is further configured to determine whether the first operating characteristic meets the first predetermined condition by comparing the image to at least one other image.

5. The system of claim 1 wherein the computing device is further configured, in receiving the input, to generate an audio recording during operation of the component of the tractor-trailer and to determine whether the first operating characteristic meets the first predetermined condition by comparing the audio recording to a pre-recorded audio recording.

6. The system of claim 1 wherein the computing device is configured for communication with a second vehicle control system of the tractor-trailer through the communications gateway and is further configured to
    receive an input indicative of a second operating characteristic of the tractor-trailer from the second vehicle control system through the communications gateway; and,
    transmit, when the second operating characteristic does not meet a second predetermined condition, a second instruction to the first vehicle control system through the communications gateway, the second instruction establishing a second restriction on operation of the tractor-trailer.

7. The system of claim 1 wherein the first restriction comprises a limitation on movement of the tractor-trailer.

8. The system of claim 1 wherein the computing device is further configured to display an indication of the first restriction to the user.

9. The system of claim 1 wherein the input comprises a vehicle identification number for the tractor-trailer and the first operating characteristic is a presence or an absence of a second vehicle control system on the tractor-trailer.

10. The system of claim 1 wherein the first vehicle control system comprises a vehicle navigation system and the first restriction comprises a limitation on recommended travel routes by the vehicle navigation system.

11. The system of claim 1 wherein the computing device is further configured to:
    monitor a location of the user relative to a location of the tractor-trailer;
    determine whether the location meets a second predetermined condition; and, transmit, when the location does not meet the second predetermined condition, a second instruction to one of the first vehicle control system and a second vehicle control system through the communications gateway, the second instruction establishing a second restriction on operation of the tractor-trailer.

12. The system of claim 1 wherein the communications gateway is configured to receive a second instruction from another computing device outside of the tractor-trailer and other than the computing device, the second instruction preventing transmission of the first instruction.

13. The system of claim 1 wherein the computing device is further configured to receive another input associated with the first task from the user, the another input indicative of a change in the first operating characteristic of the tractor-trailer.

14. A system for pre-trip inspection of a tractor-trailer, comprising:
a communications gateway configured for electronic communication with a first vehicle control system of the tractor-trailer;
a computing device configured for communication with the first vehicle control system of the tractor-trailer through the communications gateway, the computing device further configured to
display an instruction to a user to perform a first task of the pre-trip inspection;
receive an input associated with the first task from the user, the input indicative of a first operating characteristic of the tractor-trailer; and,
transmit, when the first operating characteristic does not meet a first predetermined condition, a first instruction to the first vehicle control system through the communications gateway, the first instruction establishing a first restriction on operation of the tractor-trailer
wherein the computing device is further configured, in receiving the input, to generate a video recording during operation of a component of the tractor-trailer and to determine whether the first operating characteristic meets the first predetermined condition by comparing a plurality of frames in the video recording.

15. An article of manufacture, comprising:
a non-transitory computer storage medium having a computer program encoded thereon that when executed by a controller implements a pre-trip inspection of a tractor-trailer, the computer program including code for
displaying an instruction to a user to perform a first task of the pre-trip inspection;
receiving an input associated with the first task from the user, the input indicative of a first operating characteristic of the tractor-trailer; and,
transmitting, when the first operating characteristic does not meet a first predetermined condition, a first instruction to a first vehicle control system of the tractor-trailer, the first instruction establishing a first restriction on operation of the tractor-trailer
wherein the computer program further includes code for
receiving an input indicative of a second operating characteristic of the tractor-trailer from a second vehicle control system of the tractor-trailer; and,
transmitting, when the second operating characteristic does not meet a second predetermined condition, a second instruction to the first vehicle control system through the communications gateway, the second instruction establishing a second restriction on operation of the tractor-trailer.

16. The article of manufacture of claim 15 wherein the code for displaying the instruction includes code for generating a visual overlay for a component of the tractor-trailer and the code for receiving the input includes code for capturing an image of the component once the overlay and the component are aligned on a display of the computing device.

17. The article of manufacture of claim 16 wherein the computer program further includes code for determining whether the first operating characteristic meets the first predetermined condition including code for identifying a distance between two points on the component in the image and comparing the distance to a predetermined distance.

18. The article of manufacture of claim 16 wherein the computer program further includes code for determining whether the first operating characteristic meets the first predetermined condition including code for identifying a position of a point on the component in the image and compare the position to a predetermined position.

19. The article of manufacture of claim 16 wherein the computer program further includes code for determining whether the first operating characteristic meets the first predetermined condition including code for comparing the image to at least one other image.

20. The article of manufacture of claim 15 wherein the code for receiving the input includes code for generating an audio recording during operation of a component of the tractor-trailer and the computer program further includes code for determining whether the first operating characteristic meets the first predetermined condition including code for comparing the audio recording to a pre-recorded audio recording.

21. The article of manufacture of claim 15 wherein the code for receiving the input includes code for generating a video recording during operation of a component of the tractor-trailer and the computer program further includes code for determining whether the first operating characteristic meets the first predetermined condition including code for comparing a plurality of frames in the video recording.

22. The article of manufacture of claim 15 wherein the first restriction comprises a limitation on movement of the tractor-trailer.

23. The article of manufacture of claim 15 wherein the computer program further includes code for displaying an indication of the first restriction to the user.

24. The article of manufacture of claim 15 wherein the first vehicle control system comprises a vehicle navigation system and the first restriction comprises a limitation on recommended travel routes by the vehicle navigation system.

25. An article of manufacture, comprising:
a non-transitory computer storage medium having a computer program encoded thereon that when executed by a controller implements a pre-trip inspection of a tractor-trailer, the computer program including code for
displaying an instruction to a user to perform a first task of the pre-trip inspection;
receiving an input associated with the first task from the user, the input indicative of a first operating characteristic of the tractor-trailer; and,
transmitting, when the first operating characteristic does not meet a first predetermined condition, a first instruction to a first vehicle control system of the tractor-trailer, the first instruction establishing a first restriction on operation of the tractor-trailer
wherein the input comprises a vehicle identification number for the tractor-trailer and the first operating characteristic is a presence or an absence of a second vehicle control system on the tractor-trailer.

26. An article of manufacture, comprising:

a non-transitory computer storage medium having a computer program encoded thereon that when executed by a controller implements a pre-trip inspection of a tractor-trailer, the computer program including code for displaying an instruction to a user to perform a first task of the pre-trip inspection;

receiving an input associated with the first task from the user, the input indicative of a first operating characteristic of the tractor-trailer; and, transmitting, when the first operating characteristic does not meet a first predetermined condition, a first instruction to a first vehicle control system of the tractor-trailer, the first instruction establishing a first restriction on operation of the tractor-trailer wherein the computer program further includes code for:

monitoring a location of the user relative to a location of the tractor-trailer;

determining whether the location meets a second predetermined condition; and, transmitting, when the location does not meet the second predetermined condition, a second instruction to one of the first vehicle control system and a second vehicle control system, the second instruction establishing a second restriction on operation of the tractor-trailer.

\* \* \* \* \*